US010228673B2

(12) United States Patent
Heyde et al.

(10) Patent No.: US 10,228,673 B2
(45) Date of Patent: Mar. 12, 2019

(54) METHOD, SYSTEM AND COMPUTER PROGRAM PRODUCT FOR CONTROLLING AND/OR REGULATING AN ELECTRIC ENERGY SYSTEM

(71) Applicant: SIEMENS AKTIENGESELLSCHAFT, Munich (DE)

(72) Inventors: Chris Oliver Heyde, Erlangen (DE); Rainer Krebs, Erlangen (DE); Edwin Lerch, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 33 days.

(21) Appl. No.: 15/328,992

(22) PCT Filed: Jun. 24, 2015

(86) PCT No.: PCT/EP2015/064278
§ 371 (c)(1),
(2) Date: Jan. 25, 2017

(87) PCT Pub. No.: WO2016/012186
PCT Pub. Date: Jan. 28, 2016

(65) Prior Publication Data
US 2017/0212492 A1 Jul. 27, 2017

(30) Foreign Application Priority Data

Jul. 25, 2014 (EP) .................................. 14178562

(51) Int. Cl.
*G06F 19/00* (2018.01)
*G05B 19/042* (2006.01)
(Continued)

(52) U.S. Cl.
CPC ............ *G05B 19/0428* (2013.01); *H02J 3/24* (2013.01); *H02J 13/00* (2013.01);
(Continued)

(58) Field of Classification Search
CPC combination set(s) only.
See application file for complete search history.

(56) References Cited

U.S. PATENT DOCUMENTS 5,610,834 A * 3/1997 Schlueter ............. H02J 3/1871
323/205
6,252,753 B1 * 6/2001 Bhargava ................ H02J 3/24
361/115
(Continued)

FOREIGN PATENT DOCUMENTS

EP 1381132 A1 1/2004

OTHER PUBLICATIONS

Basler et al., Understanding Power System Stability, Basler Electric Company, 2005, p. 46-67.*
(Continued)

*Primary Examiner* — Kidest Bahta
(74) *Attorney, Agent, or Firm* — Laurence Greenberg; Werner Stemer; Ralph Locher

(57) ABSTRACT

A method for controlling and/or closed-loop controlling an electric energy system. Empirical data are provided in a first data storage device for stabilizing the energy system, and a multi-dimensional decision matrix created with a data processing system in a second data storage device. The decision matrix respectively containing as a first dimension derived from the empirical data, system states of the energy system and in the energy system as a second dimension, possible results. Phasor measurement data for current and voltage with a high temporal resolution and a time stamp are obtained with phasor measuring devices distributed in the
(Continued)

energy system and used to control the electric energy system. A system state and a result determined by the data processing system using the phasor measurement data and at least one step is selected and automatically carried out for securing the stability of the energy system.

15 Claims, 1 Drawing Sheet

(51) Int. Cl.
 *H02J 3/24* (2006.01)
 *H02J 13/00* (2006.01)
 *H02J 3/00* (2006.01)

(52) U.S. Cl.
 CPC . *G05B 2219/2639* (2013.01); *H02J 2003/007* (2013.01); *Y02E 60/74* (2013.01); *Y02E 60/76* (2013.01); *Y04S 10/30* (2013.01); *Y04S 40/22* (2013.01)

(56) References Cited

U.S. PATENT DOCUMENTS

| | | | |
|---|---|---|---|
| 2011/0022240 A1 | 1/2011 | Rajapaske | |
| 2011/0066301 A1* | 3/2011 | Donolo | H02J 3/12 700/292 |
| 2012/0200966 A1* | 8/2012 | Hill | G01R 31/024 361/62 |
| 2013/0116844 A1* | 5/2013 | McNally | H02J 3/08 700/295 |
| 2013/0120105 A1 | 5/2013 | Bhageria et al. | |
| 2013/0197705 A1* | 8/2013 | Ray | H02J 3/24 700/295 |
| 2013/0304266 A1* | 11/2013 | Giannakis | G01R 21/133 700/286 |
| 2013/0345999 A1 | 12/2013 | Hafen et al. | |
| 2014/0001847 A1 | 1/2014 | Khandelwal | |

OTHER PUBLICATIONS

Hansen et al., monitoring Power System Stability,IEEE computer Applications in Power , 1999, p. 14-18.*

* cited by examiner

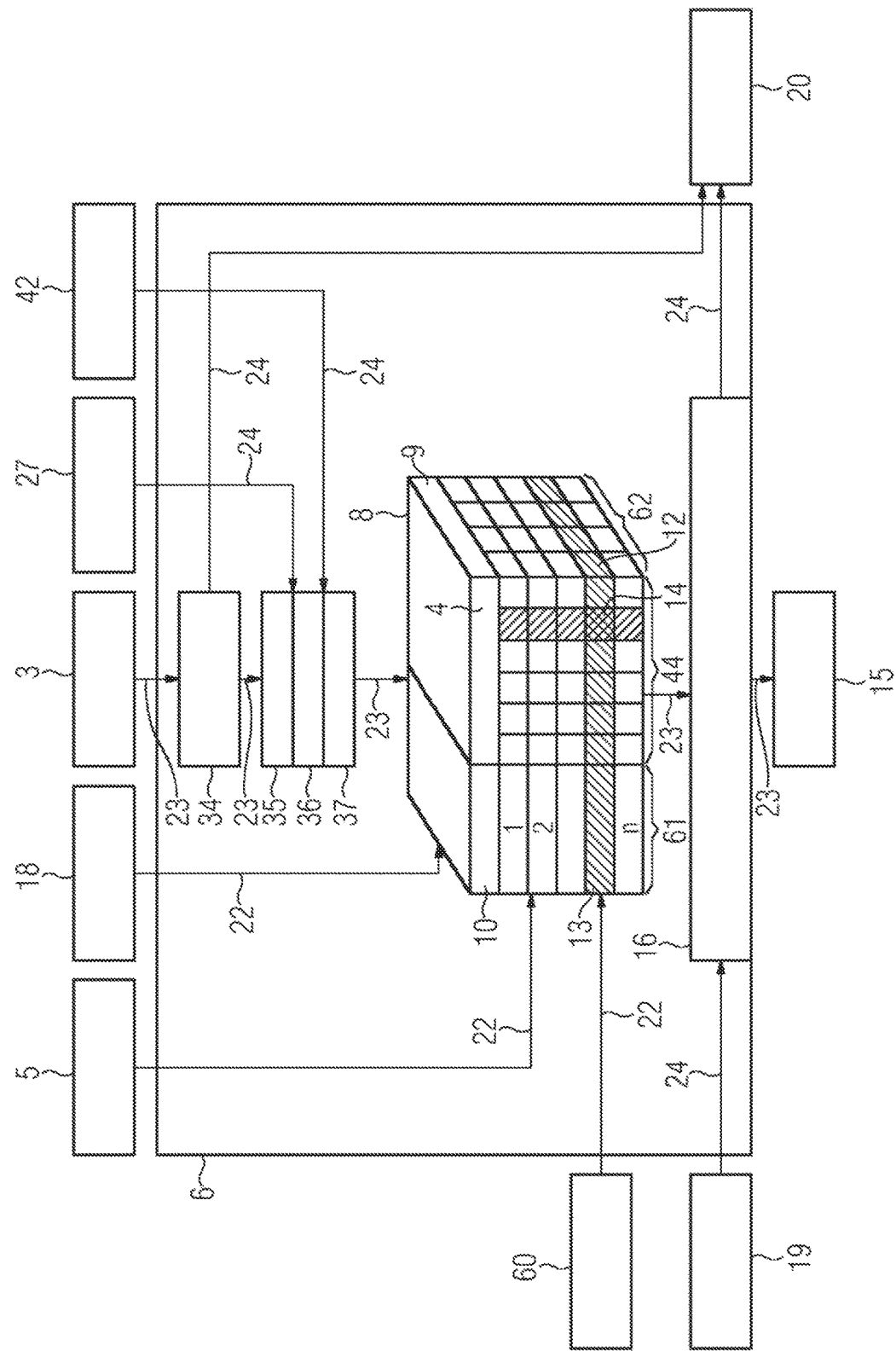

METHOD, SYSTEM AND COMPUTER PROGRAM PRODUCT FOR CONTROLLING AND/OR REGULATING AN ELECTRIC ENERGY SYSTEM

BACKGROUND OF THE INVENTION

Field of the Invention:

The invention relates to a method for controlling and/or regulating an electrical energy system.

In the operation of an electric energy system it must be ensured that in the event of a fault in individual resources of the electric energy system the stability of the energy system as a whole can be maintained.

An electrical energy system in the sense of the invention is to be understood as meaning any system that is used for generating, transmitting or consuming electric energy. An electric energy system can be, for example, a medium-voltage or a low-voltage power supply network or a generator arrangement for generating electrical energy.

Electrical energy systems are subject to an increasing demand due to the supply of electrical energy from renewable energy sources, growing energy consumption and frequently changing load situations over time due to energy trading. These problems are exacerbated by an inadequate level of expansion of electric energy systems.

This leads to recurring violations of the stationary as well as the dynamic stability. In order to avoid large-scale shutdowns and blackouts after faults, suitable measures for dealing with the respective fault must be implemented very quickly to secure the stability of the network.

In the context of so-called "day-ahead" power plant planning it is common to operate a static congestion management system to ensure the stationary (n–1) security for the following day.

This does not protect against unexpected scenarios, however.

If such unpredictable scenarios do occur, load shedding relays are used to limit the impact of faults or accident situations. These relays are dimensions based on analyses that can be obtained from so-called offline studies. Thus measures can be introduced in a standardized way to secure the stability of the network.

An example of the use of relays is the so-called 5-level load shedding plan of the European Network of Transmission System Operators for Electricity (entso-e), in which in the energy distribution network switching devices are permanently assigned to the respective load shedding level. If a fault is found in a section of the power supply network, then in accordance with the first level, load is shed by means of the assigned switching equipment, and the impact on the energy supply is observed. If a danger to the stability of the network persists, then according to the next level even more load will be shed, and so on. Decision criteria for triggering a load shedding only involve locally measured values of voltage and network frequency, which are monitored against predefined threshold values.

Such a staged load shedding plan is designed with fixed parameters and therefore is not tailored to the particular fault and the particular operating state, so that sometimes too much or too little load is shed. The load shedding can also be carried out in the wrong section of the electric energy system. In addition, the local load shedding can only take place at low frequencies, because it is necessary first of all to wait for the system response to the activation of generator reserves. For this reason, the local load shedding is often not sufficient to safeguard the network stability. Furthermore, the coordination in international composite networks consisting of several national energy distribution networks is not always guaranteed. Also such a load shedding plan is often not tailored to suit the current state of development of the electrical energy system. Also, no coordination or combination of different measures is possible.

The SIGUARD "Phasor Data Processor" (PDP) software from Siemens AG is also known, in which time-synchronized phasor measurements (phasor measurements for current and voltage) from a plurality of phasor measurement units (PMUs) can be very rapidly provided online, summarized and stored in a database.

In addition, from the product brochure "SIGUARD Solutions, Dynamic security assessment with SIGUARD DSA", dated September 2013 and from document EP 2052451 B1 which relates to this product, a method is known in which, based on the current system status, the dynamic behavior of an electric energy system is determined by simulation. In this way, the backup reserves of an electrical energy system are continuously determined afresh, in order to detect the possible impact of operating states and faults at an early stage and to propose measures to a user to prevent blackouts.

SUMMARY OF THE INVENTION

The object of the invention is to provide a method for controlling and/or regulating an electric energy system, with which measures for securing the stability of the energy system can be identified relatively quickly and in a targeted way, and carried out automatically.

The invention achieves this object by means of the claimed method.

Phasor measurement units (PMUs) in the context of the invention are measuring devices, which measure phasor measurement data for current and voltage (i.e. taking into account the phase) with high temporal resolution in the ms range and with a highly accurate time stamp, which is usually transmitted via GPS. The PMUs enable a spatially extended, synchronous measurement and an extended analysis of the system status of the energy system.

As the data storage devices, all common storage media for digital data can be used, for example hard drives, working memory or cloud-based storage space.

As the data processing arrangement, for example, a common computer, an application-specific integrated circuit (ASIC) or cloud-based computing arrangement can be used.

Empirical data are obtained, for example, from previous studies, so-called offline studies, on the stability of the electrical energy system, where experimental results and/or simulation results, such as those collected for example by grid operators on the basis of many years of experience, are taken into account.

The multidimensional decision matrix is a data structure in which at least one measure for securing the stability of the energy system is assigned to a system status of the electric energy system and to a possible event. This measure is then automatically implemented in accordance with the method, in order—for example by load shedding by means of the actuators—to stabilize the energy system. For example, a possible event is the failure of a particular transformer, and the system status is a status which characterizes the energy system under severe loading.

The dimensions of the decision matrix therefore describe, among other things, possible circuit and operating states, as well as accidents in the power distribution grid, the effects of which are countered by the identified measures. The measures are activated before locally measured limit values are exceeded and before a failure of a section of the electric energy system is imminent.

The decision matrix can be filled in the simplest case on the basis of previously known studies.

The necessary speed of response in the method according to the invention is obtained by the appropriately designed system architecture and the near real-time data processing. The necessary quality of the measures is in particular obtained by the continuous improvement of the decision matrix which takes place during ongoing operation. By means of the multi-dimensional decision matrix, measures to protect the system integrity of the electric energy system can be activated very quickly. This method ensures that measures are taken early enough, for example to keep the important system parameters, such as voltage and frequency, in a range which is necessary for stable network operation.

It is a further advantage of the method according to the invention that, from different data sources (empirical data and phasor measurement data) the system-wide situation can be determined shortly before an accident. Accidents are detected by PMU measurements with comparatively short delay. The decision-making is based largely on network-wide information, because the empirical data normally originate from offline studies of the overall energy system, and not, as is still common in the prior art (e.g. in load shedding plans), from purely local measurements of individual sections of the energy distribution grid.

Although known methods include the use of the primary control reserve of generators, or other energy generating facilities, and in the event of insufficient control reserve also load shedding by means of underfrequency relays, this often leads to low underfrequencies in the energy system, which is a disadvantage. For example, too low underfrequencies result in generator protection limits being reached. Moreover, large frequency gradients can prevent underfrequency relays from triggering at all. Both of the above cited examples aggravate the problems, which is why an urgent need for shorter response times and more accurate measures exists.

In addition, it is possible in accordance with the invention that, as soon as it is detected that the control reserve of the generators is not going to be sufficient, to overcome the fault a targeted load shedding is activated with simultaneous usage of the primary control reserve together and in a finely tuned way. This measure prevents any dangerous underfrequencies from occurring at all. In addition, a large safety margin is observed against potentially dangerous underfrequency shutdowns of generators. Furthermore, all previously used fixed parameter-based methods can continue to be used as additional safety backup.

In a preferred embodiment of the method according to the invention, the phasor measurement data obtained using the phasor measurement devices are summarized and stored in a third data storage device for evaluation over larger time intervals. This makes it possible to archive phasor measurement data over longer periods of time. This is an advantage because, on the basis of the recorded phasor measurement data over longer periods of time, improved analyses of the stability of the network can be made.

In a further preferred embodiment of the method according to the invention, the summarized phasor measurement data are used for analyzing a trend in the development of the possible network stability problem over time. This is an advantage, because on the basis of a trend faults in the power distribution network can be responded to promptly, if necessary even before a failure or an overload are imminent.

In a further preferred embodiment of the method according to the invention, the measures for securing the stability of the network are displayed on an output device. This is an advantage, because a user can monitor the correct implementation of the method on the output device with regard to a stabilization of the network.

In a further preferred embodiment of the method according to the invention, the summarized phasor measurement data are displayed on the output device. This is an advantageous, because a user can monitor the current situation of the electric energy system on the output device with regard to faults.

In a further preferred embodiment of the method according to the invention, the at least one measure for securing the stability of the network can be blocked by a user. This is an advantage, because in this way, unwanted measures can be prevented.

In a further preferred embodiment of the method according to the invention, the actuators are controlled directly. This is advantageous because the actuators can be activated particularly rapidly to initiate the at least one measure quickly.

In a further preferred embodiment of the method according to the invention, the actuators are activated via an intermediate network control system. This is advantageous because an available network regulation system can be used with its given control options.

In a further preferred embodiment of the method according to the invention, the measures for securing the stability of the energy system comprise activating switches, in particular power circuit-breakers, as actuators for shedding load in the energy distribution network. This is advantageous because individual sections of the electric energy system can thus be shut down, in order, for example, to prevent an overload and an invalid deviation in the network frequency.

In a further preferred embodiment of the method according to the invention, the measures for securing the stability of the energy system comprise controlling and/or regulating the energy supply by energy generating facilities in the form of actuators. This is an advantage because such an overload and an invalid network frequency deviation can be prevented by making more electric power available.

In a further preferred embodiment of the method according to the invention, the measures for securing the stability of the energy system comprise a change in reactive power for voltage support in the energy system.

In a further embodiment of the method according to the invention, the measures for securing the stability of the energy system comprise a comparatively faster activation of the reserve power of a generator to stabilize the network frequency within a designated range. The designated range is for example 50 Hz+/−1 Hz.

In a further preferred embodiment of the method according to the invention, the measures for securing the stability of the energy system comprise the activation of electronically controlled energy accumulators to stabilize the network frequency and the supply voltage of the energy system in a designated range.

In a further preferred embodiment of the method according to the invention, the measures for securing the stability of the energy system comprise topology changes, in order to stabilize the energy system.

In a further preferred embodiment of the method according to the invention, the measures for securing the stability of the energy system comprise forming islands within the energy system in order to stabilize a sub-network.

In a further preferred embodiment of the method according to the invention, by means of voltage and current measuring devices with low temporal resolution, values of current and voltage are measured and taken into account in the selection of the system status and of the event. This is an advantage because such voltage and current measuring devices are often already present in the power distribution network in large numbers and can therefore there deliver additional information, also from areas in which no PMUs are used. This enables the method according to the invention to be based on a wider set of data and hence to be more accurate.

In a further preferred embodiment of the method according to the invention, remote terminal units (RTUs) are used as voltage and current measuring devices. This is an advantage because RTUs are widespread.

In a further preferred embodiment of the method according to the invention, a status estimate of a Supervisory Control and Data Acquisition (SCADA) system is also used for creating the decision matrix with regard to the system states. This is an advantage because SCADA systems are often already present for controlling the electric energy system, and on the basis of models can provide information on the energy distribution network. This enables the method according to the invention to be based on a wider set of data and hence to be more accurate. Any other type of control center system that can provide a status estimate is also suitable.

In a further preferred embodiment of the method according to the invention, manually written entries can also be made in the decision matrix. This is an advantage, because the empirical knowledge of a user can also be used for enhancing the decision matrix.

The invention also relates to a system for controlling and/or regulating an energy distribution network, wherein an object of the invention is to design such a system so that it can be used to identify measures for securing the stability of the energy system relatively quickly and in a targeted way, and to implement them automatically.

The system for achieving this object is reproduced in the system claims.

In a preferred embodiment of the system according to the invention, the phasor measurement data obtained by means of the phasor measurement devices can be summarized and stored in a third data storage device for evaluation over longer time periods.

In a further preferred embodiment of the system according to the invention the active components are power circuit-breakers and/or energy generating devices.

In a further preferred embodiment of the system according to the invention, a network regulation system is connected between the actuators and the data processing arrangement.

This means that for the system according to the invention and its embodiments, the same advantages apply mutatis mutandis as those described above for the method according to the invention.

The subject matter of the invention also relates to a data processing program for execution in a data processing arrangement, wherein the data processing program comprises parts of a source code for carrying out the method according to the invention when the program is running on the data processing arrangement.

In a preferred embodiment of the data processing program according to the invention the data processing program is suitable for execution on a cloud-based data processing arrangement.

This means that for the data processing program according to the invention and its embodiments, the same advantages apply mutatis mutandis as those described above for the method according to the invention.

In addition, the invention relates to a computer program product, wherein an object of the invention is to be able to execute the method according to the invention with a computer device.

This object is achieved by using a computer program product, which is stored in a computer-readable medium and comprises computer-readable program means, by means of which a computer as a data processing arrangement and/or a cloud-based data processing arrangement are caused to carry out the method according to the invention when the computer program product is running on the computer and/or the cloud-based data processing arrangement.

This means that for the computer program product according to the invention, the same advantages apply mutatis mutandis as those described above for the method according to the invention.

BRIEF DESCRIPTION OF THE SEVERAL VIEWS OF THE DRAWING

To provide further explanation of the invention,

The figure schematically illustrates an exemplary embodiment of the system according to the invention.

DESCRIPTION OF THE INVENTION

Phasor measurement devices are distributed via an energy system and supply phasor measurement data 11 for current and voltage with high temporal resolution and a time stamp (e.g. GPS-synchronized). The phasor measurement data 11 can be collected, for example, in a first evaluation device (not shown).

Furthermore, the energy system comprises actuators 15 which can be, for example, switches, in particular power circuit-breakers, for shedding load in the energy system, and/or energy generating devices, such as generators.

In addition, the energy system includes voltage and current measuring devices, which determine the measurements for current and voltage with low temporal resolution 42, such as are determined by remote terminal units (RTUs). The measurements 42 can also be collected, for example, in a second evaluation device (not shown).

A network regulation system is also provided that evaluates measurement data, such as phasor measurement data 11 from the energy system, and on the basis of the measurement data generates a status estimate 27 with regard to the energy system.

In a variant of the invention it is possible that the first and the second evaluation device are integrated into the network regulation system, so that both the phasor measurement data 11 and the measurements for current and voltage are captured together at low temporal resolution 42 in the network regulation system. The network regulation system can comprise a Supervisory Control and Data Acquisition (SCADA) system.

A first data storage device contains empirical data 5 which, for example, comprise so-called offline studies of the electric energy system. In offline studies, simulations of the electric energy system are used to represent system states and related events that occur, thus for example specific voltage and phase values at specific measurement points in the energy system and an event, that can be e.g., a fault in relation to the network stability. An example of such a fault is a failure of a transformer. The empirical data also comprise appropriate measures for counteracting a fault.

One case which can be derived from the empirical data 5 would be to counteract a failure of a particular transformer under a given load condition of a medium-voltage network in such a way that no further network-wide blackout occurs. In this case the information on the system status comprise, for example, voltage and phase information, in particular any noticeable jumps in the phase angle.

A suitable measure to be included in the empirical data in such a case is a load shedding at specific points of the medium-voltage network.

In contrast to purely local measurements known from the prior art with local, multi-level load shedding plans, the measures taken in the empirical data 5 with regard to the entire energy system are defined in such a way that the fault can be overcome with a measure in a targeted way and taking into account the energy system behavior (e.g. delayed generator responses).

A further possibility for capturing information on the energy system involves using simulation software—e.g. in a third evaluation device—to make a status estimate 18 of the electric energy system and to constantly update it on the basis of measurements, such as phasor measurement data 11 and measurements of current and voltage, with low temporal resolution 42. Such a status estimate 18 allows much more different system states to be captured than are included in the offline studies. This status estimate 18 reflects the backup reserves of the electric energy system. In an alternative design the third evaluation device can also be part of the network regulation system or of the data processing arrangement 6 described hereafter.

Hereafter, data transfer connections which each provide updated data at comparable clock rates are labeled with the same reference numerals.

A data transfer connection 23 provides data that are updated in cycles of approximately 1 millisecond, a data transfer connection 24 provides data updated in cycles of approximately 1 second and a data transfer connection 21 provides data updated in cycles of approximately 1 minute. There are also data transfer connections 22, which provide data only on the scale of days or months, possibly even only once.

A data processing arrangement 6 is provided, which can comprise, for example, a computer, a computer network or a cloud-based data processing system.

Within the data processing arrangement 6, further method steps according to the invention take place. Individual method steps can also be executed on separate data processing arrangements and/or with separate data storage devices, however.

The data processing arrangement 6 comprises a second data storage device, in which a multi-dimensional decision matrix 8 is created. The decision matrix 8 in the example shown has two dimensions. More complex measures can be taken into account in a higher dimensionality of the decision matrix 8, so that still further aspects of the operation of the energy system can be represented.

A first dimension of the decision matrix 8 contains system states 9 of the energy system, and a second dimension contains possible events 10 in the energy system, in each case derived from the empirical data 5, wherein in each case at least one measure 44 for ensuring the stability of the energy system is assigned to the system states 9 and the events 10. The at least one measure 14, 44 in this example is also therefore derived from the empirical data 5 or offline studies.

The decision matrix 8 can also be provided with information items from still other sources, however. It can be the case, for example on the basis of the status estimate 18, that a larger number of different system states 9 are entered in the decision matrix 8, so that the differentiation of system states 9 can be advantageously more finely structured.

In addition, information 60 can be manually entered directly into the decision matrix 8. Such a direct input is usually only updated on a scale of days and months. This allows an experienced user, such as a control center technician, to insert their own empirical data on handling faults into the decision matrix and therefore also make use of their knowledge in a reproducible way. Such an entry can be, for example, how to react with appropriate measures in the event of failure of a particular part of the network.

After it is filled with system states 9, events 10 and measures 44, the decision matrix 8 represents the basis for an expert system for securing the stability of the energy system. In the example shown, on the far left of the block shown, the decision matrix 8 contains a column 61 with events 10, which are numbered 1, 2 to n. The decision matrix 8 also contains at the far right, on the side wall 62 of the block, a plurality of system states 9, wherein to each event 10 in a row a plurality of system states 9 is assigned. On the front side of the block the measures 44 are shown, which are each assigned to one event 10 and one system status 9.

If the decision matrix 8 is present, on the basis of current measurement data, such as phasor measurement data 11 from the energy system, each of the current system status 12 and the current event 13 must now be specified in the decision matrix 8, in order to select an appropriate measure 14.

This assignment takes place on the basis of the phasor measurement data 11. The phasor measurement data 11 are grouped together in step 34 to form summarized phasor measurement data, and then stored in a third data storage device, for example, for evaluation over longer time intervals. The summarized phasor measurement data are furthermore displayed on a display device 20 for the user 19, to allow the user 19 to monitor information about the current status of the energy system at any time.

The summarized phasor measurement data are then examined in step 35 to determine whether an event has occurred, such as a fault in the electrical energy system. An example of an event is the failure of a transformer or a power fluctuation in the energy system. In this step 35 the state estimate 27 provided by the network regulation system can also be included, in order to detect an event.

In a step 36, indices for the decision matrix 8 are calculated, in order to select the correct system status and to identify the correct possible event. This enables a suitable measure for securing the stability of the network to be assigned within the decision matrix 8. In the example shown the stability-related critical event is located in field 13, and comparing with the system status 12 produces the measure 14. This measure 14 for ensuring the stability of the energy system is displayed on the display device 20.

Then, in a step 37 an analysis of a trend in the summarized phasor measurement data is performed to be able to identify any increasing network stability problems at an early stage and to initiate measures appropriately. For example, an escalating power fluctuation can thus be detected even before a critical event occurs. This is advantageous because it makes more time available for counter measures.

In an alternative configuration the steps 34 to 37 can also be merged into an event detection device and, for example, configured as a separate data processing device or as a piece of software within the data processing arrangement 6.

The selected measure 14 is activated in a step 16 for implementation. This activation can be blocked by the user 19, for example because the user 19 detects a malfunction or would prefer to implement other measures himself.

If no such blocking takes place, the activated measure 14 is automatically communicated to at least one actuator 15, which can be, for example, a power circuit-breaker or a power generating device. The measure 14 is automatically implemented and can be, for example, a suitable load shedding by means of a power circuit-breaker.

By means of the system according to the invention therefore, a plurality of different types of information in different data formats according to a wide variety of standards are able to be processed. For example, phasor measurement data 11 that are obtained by means of the phasor measuring devices can be transmitted by means of the IEEE standard C37.118. The status estimate 18 can be compliant, for example, with the CIM PSS/E standard. The data obtained by means of the RTUs can be compliant, for example, with IEC 60 870-5. The implementation of the measure 14 or the transmission of the measure 14 to an actuator 15, can be effected to the IEC/61 850 standard.

The invention claimed is:

1. A method for controlling an electric energy system, the method comprising:
   providing empirical data on a stability of the energy system in a first data storage device;
   providing a multidimensional decision matrix created in a second data storage device using a data-processing arrangement, wherein a first dimension of the decision matrix contains system states of the energy system and a second dimension contains possible events in the energy system, in each case derived from the empirical data, wherein in each case at least one measure for ensuring the stability of the energy system is assigned to the system states and the events;
   acquiring phasor measurement data for current and voltage with a temporal resolution in a millisecond range and a time stamp, each acquired by respective phasor measuring devices distributed in the energy system; and
   selecting a system state and an event by the data processing arrangement on a basis of the phasor measurement data, to thereby select and automatically implement at least one measure by way of actuators in the energy system to secure the stability of the energy system, the at least one measure for securing a network stability of the energy system including controlling and/or closed-loop controlling an energy supply into the electric energy system by energy generators as actuators.

2. The method according to claim 1, which comprises summarizing the phasor measurement data obtained by way of the phasor measurement devices and storing in a third data storage device for evaluation over greater time intervals.

3. The method according to claim 2, which comprises using the summarized phasor measurement data for analyzing a trend in the chronological development of a possible event.

4. The method according to claim 1, wherein the actuators used to secure the stability of the energy system are actuating switches for shedding load in the energy system.

5. The method according to claim 4, wherein the actuating switches are power circuit-breakers.

6. The method according to claim 1, wherein the measures for securing the stability of the energy system comprise a change in reactive power for voltage support in the energy system.

7. The method according to claim 1, wherein the measures for ensuring the stability of the energy system comprise an activation of a reserve power of a generator, in order to stabilize a network frequency in a designated range.

8. The method according to claim 1, wherein the measures for securing the stability of the energy system comprise activating electronically controlled energy accumulators to stabilize a mains frequency and a supply voltage of the energy system in a designated range.

9. The method according to claim 1, wherein the measures for securing the stability of the energy system comprise changing a topology of the system, in order to stabilize the energy system.

10. The method according to claim 1, wherein the measures for securing the stability of the energy system comprise forming islands within the energy system, in order to stabilize a sub-network of the energy system.

11. The method according to claim 1, which comprises measuring values for current and voltage with voltage and current measuring devices having a relatively lower temporal resolution than the phasor measurements, and taking the values for the current and the voltage into account when selecting the system status and the event.

12. The method according to claim 1, which comprises additionally taking into account a status estimate of a network control system when selecting the system status and the event.

13. The method according to claim 1, wherein the network control system is a Supervisory Control and Data Acquisition (SCADA) system.

14. A system for control and/or closed-loop control of an electric energy system, comprising:
   phasor measurement devices distributed in the electric energy system for obtaining phasor measurement data with a temporal resolution in a millisecond range and with a time stamp; and
   a first data storage device configured to store empirical data on a stability of the energy system; and
   a data-processing arrangement having a second data storage device, providing a multi-dimensional decision matrix;
   the decision matrix having a first dimension containing system states of the energy system and a second dimension containing possible events in the energy system, in each case derived from the empirical data;
   wherein in each case at least one measure for ensuring the stability of the energy system is assigned to the system states and the events;
   said data processing arrangement being configured to select, on a basis of phasor measurement data, one system state and one event to thereby select at least one measure; and
   actuators disposed in the energy system for automatically implementing the selected measure for securing the stability of the energy system;
   said actuators including energy generators and the measures for securing a network stability of the energy system including controlling and/or closed-loop controlling an energy supply into the electric energy system by said energy generators.

15. A computer program product, comprising a non-transitory computer-readable medium storing computer-readable program code configured to cause a computer, forming a data processing arrangement, and/or a cloud-based data processing arrangement to carry out the method according to claim 1, when the computer program product is executed on the computer and/or on the cloud-based data processing arrangement.

\* \* \* \* \*